US012262837B2

(12) United States Patent
Messler et al.

(10) Patent No.: US 12,262,837 B2
(45) Date of Patent: *Apr. 1, 2025

(54) SOUS VIDE COOKER

(71) Applicant: Anova Applied Electronics, Inc., San Francisco, CA (US)

(72) Inventors: Carl Hakan Messler, San Francisco, CA (US); Xia Yujie, San Francisco, CA (US); Vivian Lee Hu, San Francisco, CA (US)

(73) Assignee: Anova Applied Electronics, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,961

(22) Filed: Jan. 26, 2024

(65) Prior Publication Data

US 2024/0164565 A1     May 23, 2024

Related U.S. Application Data

(60) Continuation of application No. 18/123,550, filed on Mar. 20, 2023, now Pat. No. 11,910,948, which is a continuation of application No. 17/490,580, filed on Sep. 30, 2021, now Pat. No. 11,622,644, which is a division of application No. 16/382,534, filed on Apr. 12, 2019, now Pat. No. 11,375,843.

(51) Int. Cl.
*A47J 27/10* (2006.01)
*A47J 27/00* (2006.01)

(52) U.S. Cl.
CPC .............. *A47J 27/10* (2013.01); *A47J 27/004* (2013.01)

(58) Field of Classification Search
CPC ........... A47J 27/10; A47J 27/12; A47J 27/004

USPC ............................................. 99/359
See application file for complete search history.

(56) References Cited

U.S. PATENT DOCUMENTS

| 1,703,099 A | 2/1929 | Craddock |
| 1,864,149 A | 6/1932 | Rockwell |
| 2,140,315 A | 12/1938 | Dollinger |
| 3,114,154 A | 12/1963 | Laughlin |
| 3,270,661 A | 9/1966 | Juvan |

(Continued)

FOREIGN PATENT DOCUMENTS

| CN | 102192597 A | 9/2011 |
| CN | 103211494 A | 7/2013 |

(Continued)

OTHER PUBLICATIONS

Chinese Office Action for Chinese Application No. 202010284914. 0, dated Jun. 15, 2022 with translation, 14 pages.

(Continued)

*Primary Examiner* — Omar Flores Sanchez
(74) *Attorney, Agent, or Firm* — Chrisman Gallo Tochtrop LLC

(57) ABSTRACT

A sous vide cooker having a housing, a bulkhead attached to the housing to form a first cavity, a heat sink attached to the bulkhead to form a second cavity, and a skirt attached to the bulkhead to form a third cavity below the heat sink. A TRIAC is physically attached in conductive thermal communication to the heat sink in the second cavity. The cooker also has a motor, an impeller located in the third cavity, a drive shaft extending through at least the heat sink and into the third cavity and operatively connecting the motor to the impeller, and a heating element located within the third cavity.

19 Claims, 7 Drawing Sheets

(56) References Cited

U.S. PATENT DOCUMENTS

| | | |
|---|---|---|
| 3,273,717 A | 9/1966 | Canterbury |
| D214,165 S | 5/1969 | Sesholtz |
| 4,045,606 A | 8/1977 | Kalkowski |
| 4,099,406 A | 7/1978 | Fulkerson |
| 4,612,949 A | 9/1986 | Henson |
| 4,817,217 A | 4/1989 | Lively et al. |
| 4,933,527 A | 6/1990 | Edamura |
| 4,993,593 A | 2/1991 | Fabiano et al. |
| 5,146,840 A | 9/1992 | Hedenberg |
| 5,317,134 A | 5/1994 | Edamura |
| 5,321,229 A | 6/1994 | Holling et al. |
| 5,336,401 A | 8/1994 | Tu |
| 5,368,384 A | 11/1994 | Duncan et al. |
| 5,372,422 A | 12/1994 | Dubroy |
| 5,401,401 A | 3/1995 | Hickok et al. |
| 5,412,171 A | 5/1995 | Yahav et al. |
| 5,516,208 A | 5/1996 | Givant |
| 5,542,344 A | 8/1996 | Koether et al. |
| 6,079,486 A | 6/2000 | Cennamo et al. |
| 6,113,258 A | 9/2000 | Ardent |
| 6,286,990 B1 | 9/2001 | Torres |
| 6,539,842 B1 | 4/2003 | Chapman et al. |
| 6,604,917 B2 | 8/2003 | Casper et al. |
| 6,763,879 B1 | 7/2004 | Macheske et al. |
| 6,796,220 B2 | 9/2004 | Lee |
| 6,962,290 B2 | 11/2005 | Kwon et al. |
| 7,026,929 B1 | 4/2006 | Wallace |
| 8,087,822 B2 | 1/2012 | Peng |
| 8,122,815 B2 | 2/2012 | Wolfe |
| 8,172,451 B2 | 5/2012 | Li |
| 8,218,402 B2 | 7/2012 | Lewis et al. |
| 8,469,678 B2 | 6/2013 | Preston |
| 9,642,494 B1 | 5/2017 | Brun |
| 10,709,282 B2 | 7/2020 | Lee |
| 2004/0221736 A1 | 11/2004 | Park et al. |
| 2004/0223404 A1 | 11/2004 | Hughes |
| 2005/0223910 A1 | 10/2005 | Hankinson |
| 2006/0239113 A1 | 10/2006 | Harris et al. |
| 2008/0000357 A1 | 1/2008 | Yang et al. |
| 2008/0066624 A1 | 3/2008 | Taylor et al. |
| 2008/0136581 A1 | 6/2008 | Heilman et al. |
| 2008/0199164 A1 | 8/2008 | Wortley |
| 2008/0218493 A1 | 9/2008 | Patten et al. |
| 2008/0239113 A1 | 10/2008 | Baron |
| 2008/0260557 A1 | 10/2008 | Austin et al. |
| 2009/0087534 A1 | 4/2009 | McLemore |
| 2009/0093983 A1 | 4/2009 | Trafford |
| 2009/0120301 A1 | 5/2009 | Severnak |
| 2009/0153490 A1 | 6/2009 | Nymark et al. |
| 2009/0241344 A1 | 10/2009 | Mastroianni |
| 2010/0090656 A1 | 4/2010 | Shearer et al. |
| 2010/0154656 A1 | 6/2010 | Yamamoto et al. |
| 2010/0199854 A1 | 8/2010 | Homme et al. |
| 2011/0036164 A1 | 2/2011 | Burdi |
| 2011/0070340 A1 | 3/2011 | Pechaigner et al. |
| 2011/0088564 A1 | 4/2011 | Bonsell |
| 2011/0117259 A1 | 5/2011 | Storek et al. |
| 2011/0185915 A1 | 8/2011 | Eades et al. |
| 2011/0186283 A1 | 8/2011 | Preston |
| 2011/0217439 A1 | 9/2011 | Morandotti et al. |
| 2012/0053747 A1 | 3/2012 | Tanaka et al. |
| 2013/0091883 A1 | 4/2013 | Perez et al. |
| 2013/0112683 A1 | 5/2013 | Hegedis et al. |
| 2013/0220143 A1 | 8/2013 | Fetterman et al. |
| 2013/0302483 A1 | 11/2013 | Riefenstein |
| 2014/0026762 A1 | 1/2014 | Riefenstein |
| 2014/0208957 A1 | 7/2014 | Imai et al. |
| 2014/0260998 A1 | 9/2014 | Pearson |
| 2014/0322418 A1 | 10/2014 | Cowe |
| 2014/0373723 A1 | 12/2014 | Vestreli et al. |
| 2015/0064314 A1 | 3/2015 | Manuel et al. |
| 2015/0082996 A1 | 3/2015 | Wu |
| 2015/0257574 A1 | 9/2015 | Hoare et al. |
| 2015/0265090 A1 | 9/2015 | Pennella |
| 2015/0289544 A1 | 10/2015 | Ferreira et al. |
| 2015/0335192 A1 | 11/2015 | Plazarte et al. |
| 2015/0342392 A1 | 12/2015 | Wu |
| 2016/0083048 A1 | 3/2016 | Munsch |
| 2016/0192801 A1 | 7/2016 | Wu |
| 2016/0198883 A1 | 7/2016 | Wang et al. |
| 2017/0245673 A1 | 8/2017 | Peng et al. |
| 2018/0160841 A1 | 6/2018 | Wu |
| 2019/0124722 A1 | 4/2019 | Young et al. |
| 2020/0297143 A1 | 9/2020 | Upston et al. |
| 2021/0052102 A1 | 2/2021 | Foxlee et al. |

FOREIGN PATENT DOCUMENTS

| | | |
|---|---|---|
| CN | 205410821 U | 8/2016 |
| CN | 108064138 A | 5/2018 |
| CN | 208510729 U | 2/2019 |
| DE | 10219754 A1 | 11/2003 |
| EP | 0130757 A2 | 1/1985 |
| EP | 2354738 A2 | 8/2011 |
| EP | 2407703 A2 | 1/2012 |
| EP | 2767159 A1 | 8/2014 |
| EP | 2950612 A1 | 12/2015 |
| GB | 2260002 A | 3/1993 |
| GB | 2501059 A | 10/2013 |
| JP | 63196984 U | 12/1988 |
| JP | 2006334208 A | 12/2006 |
| JP | 2008043502 A | 2/2008 |
| JP | 2014001870 A | 1/2014 |
| KR | 20120049118 A | 5/2012 |
| WO | 0152478 A2 | 7/2001 |
| WO | 2004008923 A2 | 1/2004 |
| WO | 2012156890 A2 | 11/2012 |
| WO | 2014019018 A1 | 2/2014 |
| WO | 2017066692 A1 | 4/2017 |
| WO | 2019046878 A1 | 3/2019 |

OTHER PUBLICATIONS

Extended European Search Report for European Application No. 20161744.6, dated Sep. 1, 2020, 9 pages.

Lopez-Alt, J.K., "Is the Nomiku Portable Sous-Vide Cooker the Solution We're Looking for?", Serious Eats, Jun. 28, 2012; downloaded from http://www/seriouseats.com/2012/06/is-the-nomiku-portable-sous-vide-cooker-the-s.html, 2 pages.

News Anova Inc. Water Bath Company, May 8, 2014, from the internet: http://www.waterbaths.com/news.html., 1 page.

Non Final Office Action for U.S. Appl. No. 16/382,534, mailed Nov. 16, 2021, 15 pages.

Studio Kitchen, "Anova Immersion Circulator", May 8, 2014, downloaded from http//www.studiokitchen.com/studio-kitchen/anova-immersion-circulator, 8 pages.

Entire patent prosecution history of U.S. Appl. No. 16/382,534, filed Apr. 12, 2019, entitled, "Sous Vide Cooker."

Entire patent prosecution history of U.S. Appl. No. 17/490,580, filed Sep. 30, 2021, entitled, "Sous Vide Cooker."

Entire patent prosecution history of U.S. Appl. No. 17/577,241, filed Jan. 17, 2022, entitled, "Sous Vide Cooker."

Extended European Search Report for European Application No. 23172372.7, dated Jun. 13, 2023, 11 pages.

FIG. 5A
FIG. 5B
FIG. 5C
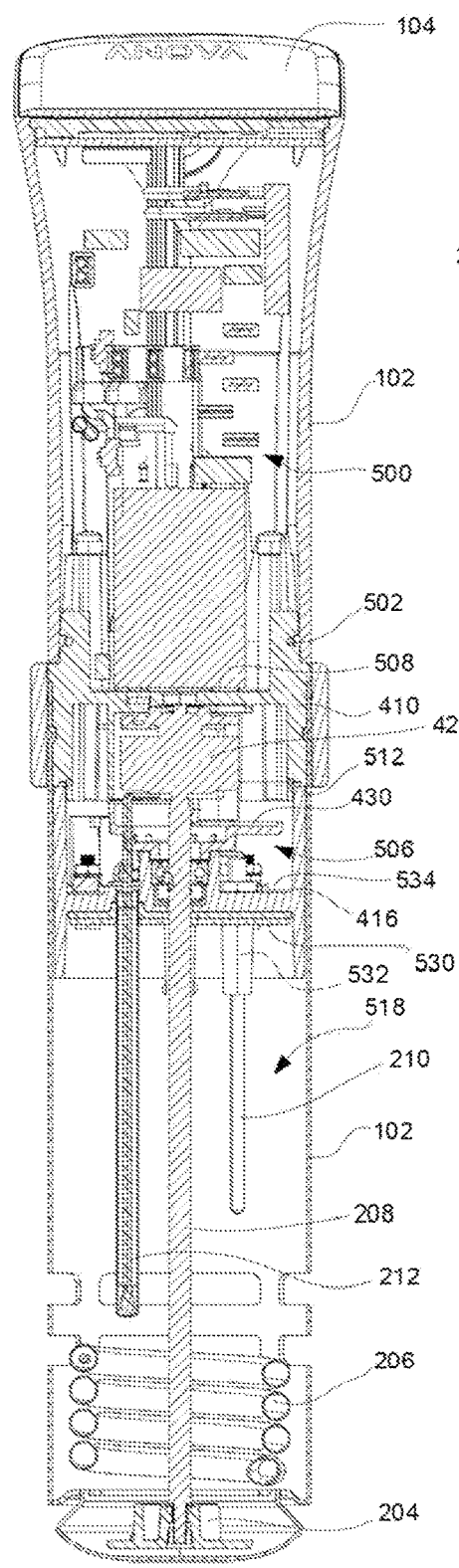
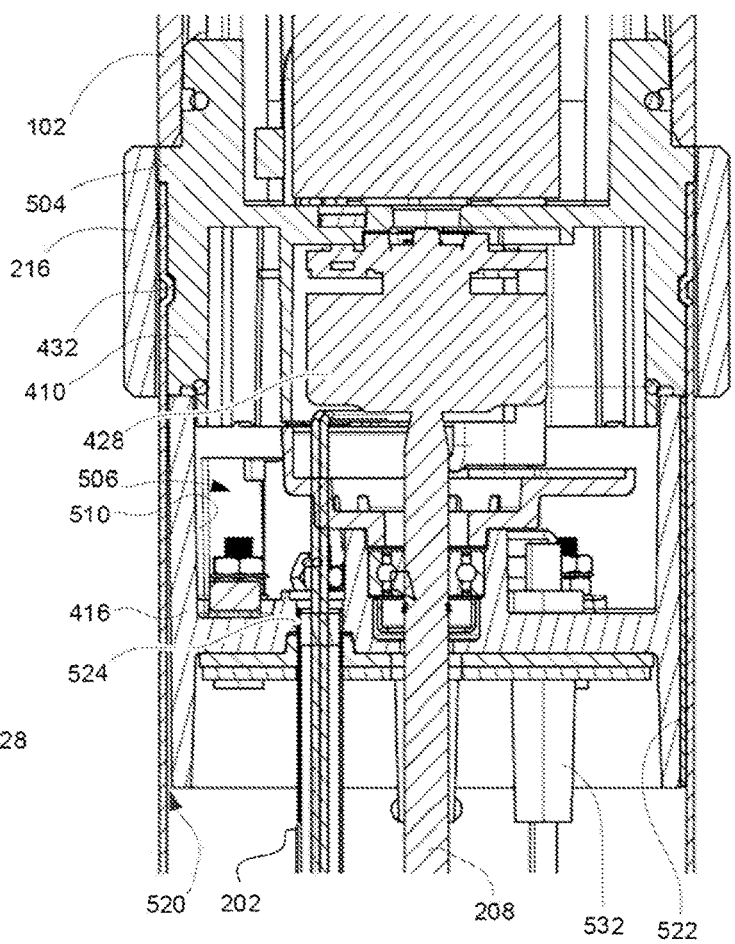
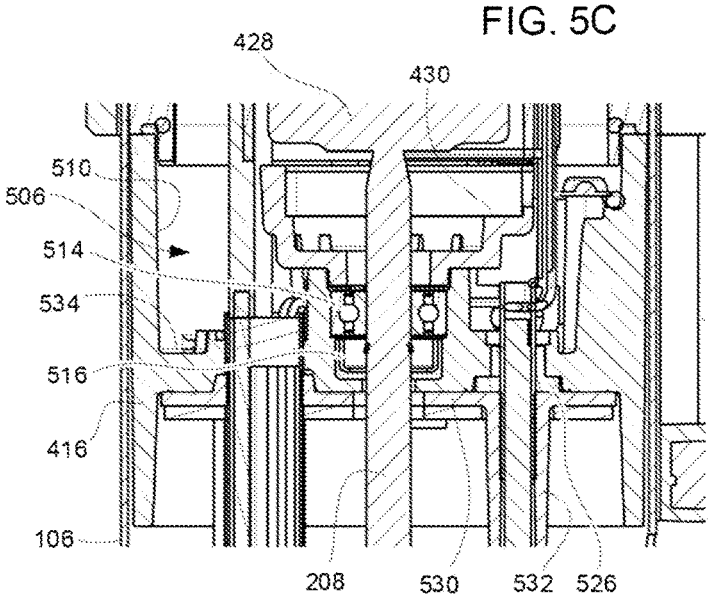

SOUS VIDE COOKER

This application is a continuation of U.S. application Ser. No. 18/123,550 filed on Mar. 20, 2023, which is a continuation of U.S. application Ser. No. 17/490,580, filed on Sep. 30, 2021, which is a divisional of U.S. application Ser. No. 16/382,534, filed on Apr. 12, 2019, all of which are incorporated herein by reference.

TECHNICAL FIELD

This application relates to the field of sous vide immersion cooking systems in which a unitary housing is partially submerged into a liquid cooking medium.

BACKGROUND

Sous vide cooking devices are in popular use in commercial and home kitchens. A sous vide cooking device operates by heating water or another liquid medium to a predetermined temperature, and immersing a food item into the liquid to be cooked. Sous vide differs from simple boiling or the like in that the food item is isolated from the liquid (e.g., by a vacuum package or plastic bag), and the cooking temperature is typically relatively low (e.g., 125° F.).

A typical professional sous vide cooker comprises a heating and circulation system and a separate bath structure. The bath holds the food items, and the heating and circulation system pumps heated liquid into and out of the bath. The heating and circulation system is isolated from the bath itself, and thus an operator is unlikely to come into contact with the heating elements or other heated components other than the liquid.

Sous vide cookers used on household kitchens are typically of the "immersion" type, in which the sous vide cooker is provided as a single unitary device having a heater and a pump. The immersion cooker is used by partially submerging it into a liquid bath provided in a container such as a pot or tub. Such immersion cookers usually are configured to work in a wide variety of different containers by having adjustable clamps and the like. While immersion cookers are more portable than the typical professional sous vide system, they also present more opportunities for the user to come into contact with the heated portions of the sous vide cooker. For example, a user could remove the sous vide cooker while the heating element is active (or shortly after deactivation) and touch the normally-submerged portion of the immersion cooker holding the heating element. This problem is exacerbated by the making the sous vide cooker smaller, as is typically desired in consumer appliances.

The inventors have determined that there is a need to provide better heat control in sous vide immersion cookers.

This description of the background is provided to assist with an understanding of the following explanations of exemplary embodiments, and is not an admission that any or all of this background information is necessarily prior art.

SUMMARY

In one aspect, there is provided a sous vide cooker having a housing extending along an longitudinal axis from an upper housing end to a lower housing end and comprising at least one display, a bulkhead having an upper bulkhead end extending along the longitudinal axis into the lower housing end, and a lower bulkhead end extending along the longitudinal axis below the housing, the bulkhead and housing forming a first cavity therebetween, and a heat sink comprising a metal material and having an upper heat sink end abutting the bulkhead and a lower heat sink end extending along the longitudinal axis below the bulkhead, the heat sink and bulkhead forming a second cavity therebetween. A skirt is attached at an upper skirt end to the bulkhead and extends to a lower skirt end located below the lower heat sink end to form a third cavity between the skirt and the heat sink. The skirt surrounds the heat sink in a direction perpendicular to the longitudinal axis, and has one or more one or more inlet openings and one or more outlet openings located below the lower heat sink end. A TRIAC is physically attached in conductive thermal communication to the heat sink in the second cavity. An impeller is located in the third cavity. A drive shaft extends through at least the heat sink and into the third cavity and is operatively connected to the impeller. A motor is operatively connected to the drive shaft. A heating element located within the third cavity.

In some embodiments, the bulkhead may have a circumferential rib positioned between the lower housing end and the upper skirt end, and the lower housing end, circumferential rib and upper skirt end may form a continuous wall profile along a predetermined distance along the longitudinal axis.

In some embodiments, the heat sink may be a monolithic piece of aluminum.

In some embodiments, the heating element may be mounted to the heat sink.

In some embodiments, the heating element may have a coil surrounding the drive shaft.

In some embodiments, the cooker may include at least one temperature sensor or water level sensor mounted to the heat sink and extending into the third cavity. The at least one temperature sensor or water level sensor may be mounted to the heat sink by an electrical insulator, and the cooker may further have a seal of insulating material covering the lower heat sink end and surrounding the at least one temperature sensor or water level sensor.

In some embodiments, the TRIAC may be attached to the heat sink by a layer of thermal grease.

In some embodiments, the second cavity may be formed at least in part by a recess in the heat sink, the recess extending from the upper heat sink end towards the lower heat sink end. The recess may have a cylindrical shape. The recess may have a sidewall extending from the upper heat sink end to a bottom wall at a lower end of the sidewall, and the TRIAC may be attached to the side wall. An axial bore may extend within the sidewall adjacent the TRIAC, and a temperature sensor may be located in the axial bore.

In some embodiments, the motor may be located in the second cavity.

In some embodiments, the skirt may be spaced in a direction perpendicular to the longitudinal axis from the heat sink by a gap so as to not directly contact the heat sink. An insulation sleeve may be located between and physically separate the skirt and the heat sink.

In some embodiments, the skirt may have one or more connector pins extending inward towards the bulkhead, and the bulkhead may have one or more connector slots configured to receive the one or more connector pins in an axial direction and a circumferential direction to secure the skirt to the bulkhead. The heating element may have one or more external slots extending from the one or more connector slots to slidingly receive the connector pins therein.

In some embodiments, the heat sink may have a motor shaft passage at the lower heat sink end through which the motor shaft passes, and a bearing in the motor shaft passage to support the motor shaft in a lateral direction perpendicular to the longitudinal axis.

In some embodiments, at least a portion of the heating element may be located along the longitudinal axis between the one or more one or more inlet openings and the one or more outlet openings, and the impeller may be located between the heating element and the lower skirt end.

In another exemplary embodiment, there is provided a sous vide cooker having a housing extending along an longitudinal axis from an upper housing end to a lower housing end and comprising at least one display, a bulkhead having an upper bulkhead end extending along the longitudinal axis into the lower housing end, and a lower bulkhead end extending along the longitudinal axis below the housing, the bulkhead and housing forming a first cavity therebetween, and a skirt attached at an upper skirt end to the bulkhead and extending to a lower skirt end located below the lower bulkhead end to form a second cavity between the skirt and the bulkhead. The skirt has one or more one or more inlet openings and one or more outlet openings located below the lower bulkhead end. An impeller is located in the second cavity. A drive shaft extends through the bulkhead and into the second cavity and is operatively connected to the impeller. A motor is operatively connected to the drive shaft. A heating element is located within the second cavity. A ring-shaped metal heat sink is located in the first cavity. A TRIAC is physically attached in conductive thermal communication to the heat sink in the first cavity.

BRIEF DESCRIPTION OF THE DRAWINGS

Embodiments of inventions will now be described, strictly by way of example, with reference to the accompanying drawings, in which:

FIG. 5A is a cutaway front elevation view of the first exemplary sous vide cooker.

FIG. 5B is a magnified view of a portion of the view of FIG. 5A

FIG. 5C is a cutaway side elevation view of a portion of the first exemplary sous vide cooker.

DESCRIPTION OF EXEMPLARY EMBODIMENTS

Figure 1:
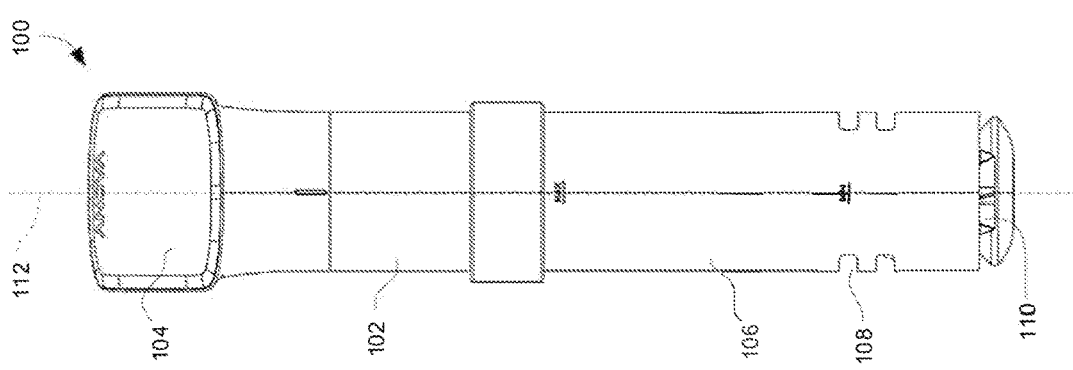
FIG. 1 is a front elevation view of a first exemplary sous vide cooker.

FIG. 1 is a front elevation view of an example of an immersion type sous vide cooker 100. In general terms, the cooker 100 has a housing 102 on which a display 104 is mounted, and a skirt 106 extending downwardly from the housing 102. The display 104 illustrates information relevant to the operation of the cooker 100 or other information to a user. One or more controllers, such as dials, buttons, touchscreen interfaces, and the like, may be provided to control the device's operating settings. In the shown example, the display 104 includes integrated capacitive sensing buttons or the like. The cooker 100 preferably also may be controlled by wireless communication with an external controlling device, such as a dedicated remote control, or a smartphone or other multifunction computing device having software configured to communicate with and control the cooker 100, as known in the art. The skirt 106 includes one or more inlet openings 108 to receive cooking liquid, and one or more outlet openings 110 to eject cooking liquid, as discussed in more detail below.

The cooker 100 and its various parts (e.g., the display 104) may have any suitable shape, but preferably is elongated along a longitudinal axis 112. The longitudinal axis 112 preferably is oriented vertically (i.e., in the gravitational vertical direction) during use of the cooker 100. Terms of relative orientation, such as "upper," "lower," "above," "below," are used herein for convenience in describing the features, and in use it is expected that the longitudinal axis 112 generally will be oriented vertically. However, these relative terms are not intended to require a particular orientation of the cooker 100 in space, and it will be understood that the cooker 100 could exist and be operated with the longitudinal axis 112 in a non-vertical orientation (e.g., tilted), in which case the relative terms would still refer to orientation along the longitudinal axis 112.

Figure 3:
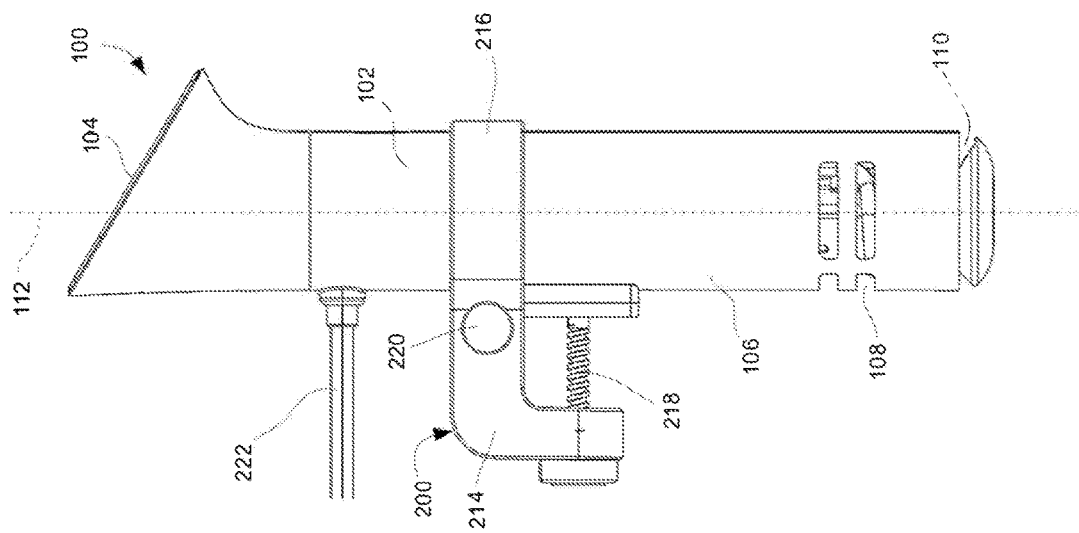
FIG. 3 is a left side elevation view of the first exemplary sous vide cooker.
Figure 2:
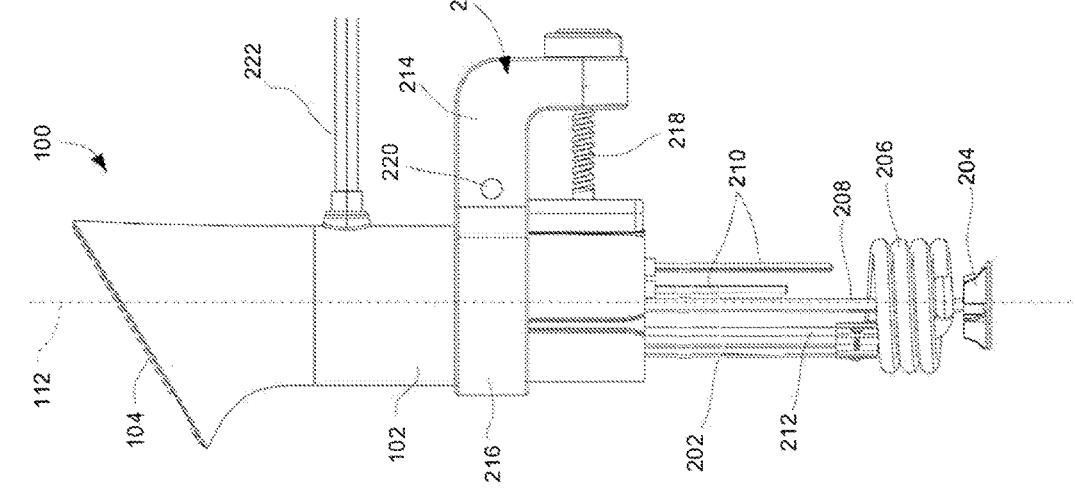
FIG. 2 is a right side elevation view of the first exemplary sous vide cooker, shown with the skirt removed.

Referring to FIGS. 2 and 3, a clamp 200, clip or other structure may be provided to secure the cooker 100 to a pot or other container, with the skirt 106 immersed in a cooking liquid. In the shown example, the clamp 200 comprises an arm 214 that is slidably mounted by a ring-shaped collar 216 to the housing 102 and/or skirt 106. The collar 216 has a bore with a cross-sectional shape that matches the shape of the housing 102 and skirt 106 (e.g., cylindrical) to allow sliding and/or rotational movement. A first threaded locking screw 218 is provided on the arm 214 to clamp onto a container, and a second threaded locking screw 220 is provided to tighten the collar 216 to prevent sliding.

The skirt 106 surrounds a heating element 202 and an impeller 204, which are operative to heat and circulate the cooking liquid. In this case, the heating element 202 comprises a resistance heater that extends downward into the skirt 106 and is shaped into a number of coils 206 to concentrate heat generation towards the lower end of the cooker 100. The impeller 204 is comprises a vaned disk located below the heating element coils 206. The impeller 204 is mounted on a drive shaft 208 by any suitable connector (e.g., threaded engagement), and the drive shaft 208 may pass through the heating element coils 206 to a motor, as discussed in more detail below.

The skirt 106 also may contain a variety of sensors or other operative components. For example, one or more water level sensors 210 or temperature sensors 212 may be suspended within the skirt 106 adjacent the heating element 202 and drive shaft 208.

The cooker 100 also may include a power cord 222 to attach to a conventional 120 or 240 volt AC power supply, display lights located other than on the display 104, audio speakers, handles, or other conventional features.

Figure 4:
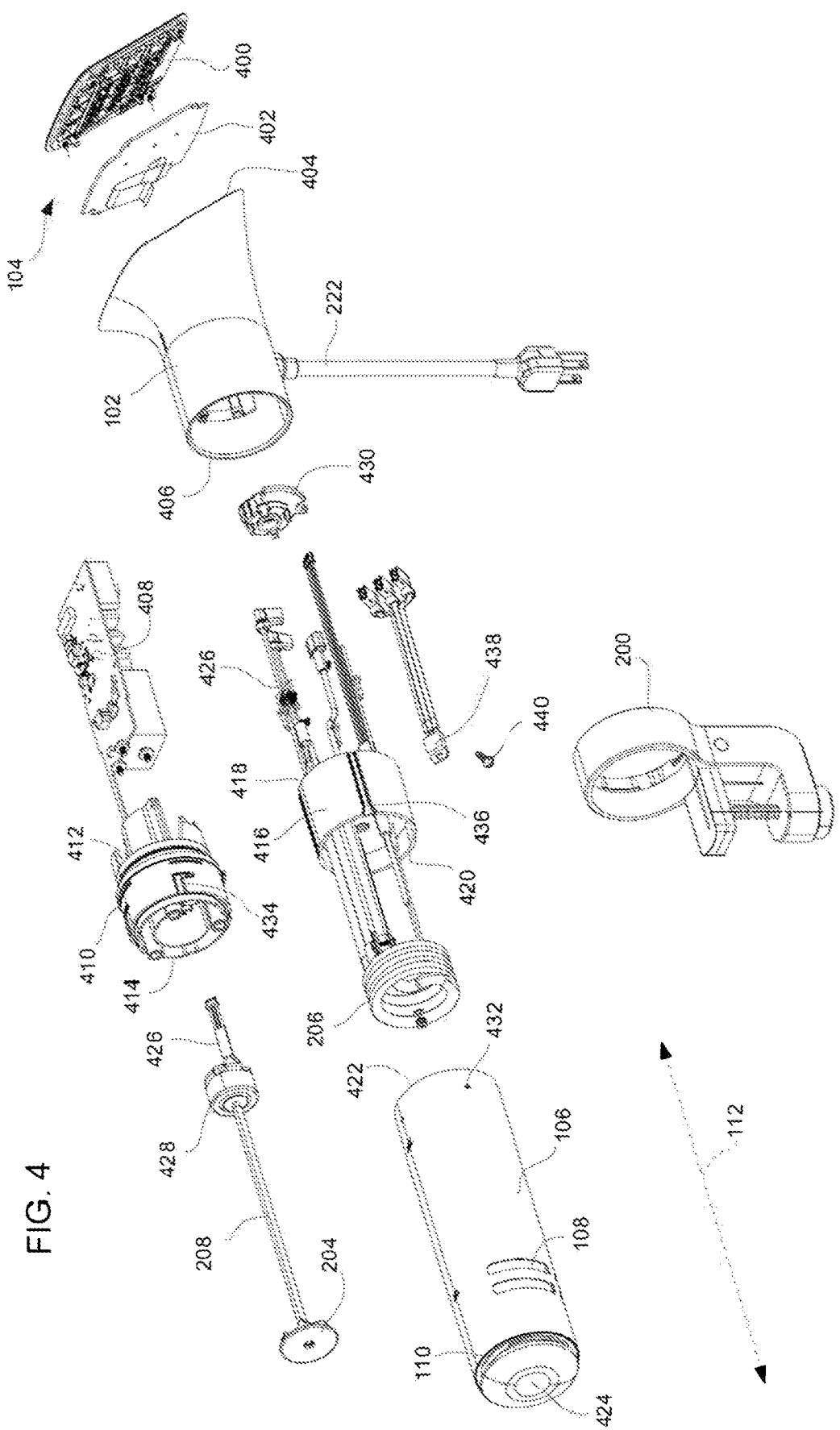
FIG. 4 is an exploded view of the first exemplary sous vide cooker.

FIG. 4 is an exploded view of the cooker 100 showing the internal components in more detail. Working downward from the upper end, the cooker 100 includes the display 104, including a display cover 400 and display lighting and input element 402 comprising one or more light emitting diodes (LEDs), liquid crystal displays, or the like, as well as input sensors such as capacitive or pressure-sensitive switches. The display 104 is connected to the housing 102 at an upper housing end 404. The housing 102 extends, along the longitudinal axis 112, from the upper housing end 404 to a lower housing end 406. Electrical controls, such as a printed circuit board (PCB) 408 are located inside the housing 102. The electrical controls may comprise any suitable controller operatively connected to the other electrical components to operate the display 104, the motor 428, the heating element 202, and so on.

A bulkhead 410 is attached the housing 102 at the lower housing end 406. The bulkhead 410 extends along the longitudinal axis 112 from an upper bulkhead end 412 to a lower bulkhead end 414. The bulkhead 410 may be shaped such that the upper bulkhead end 412 extends upwards beyond the lower housing end 406 to be located inside the housing 102 (as shown), outside the housing 102, or both. The upper bulkhead end 412 also may be flush with the lower housing end 406. The lower bulkhead end 414 extends below the housing 102.

A heat sink 416 is provided with an upper heat sink end 418 abutting the bulkhead 410 and a lower heat sink end 420 extending along the longitudinal axis 112 below the bulkhead 410. The heat sink 416 preferably comprises a metal material having a high thermal conductivity, such as aluminum. The heat sink 416 also preferably is a monolithic piece of aluminum (i.e., formed from one single aluminum billet or casting), but this is not strictly required—for example, the heat sink 416 may comprise two halves that are joined together by fasteners or interlocking shapes. The heat sink 416 may include one or more ribs or vanes to promote convection flows to enhance heat dissipation, but this is not required.

The skirt 106 extends from an upper skirt end 422 to a lower skirt end 424. The upper skirt end 422 is attached to the bulkhead 410, but alternatively may be attached to the housing 102 or the heat sink 416. The lower skirt end 418 is located below the heating element 202, and may be closed by a cover that is formed integrally with or attached to the remainder of the skirt 106, or it may be open or have holes to allow liquid to pass therethrough.

One or more electrical wires 426 are provided to connect the heating element 202, water level sensors 210 and temperature sensor 212 to the PCB 408 and other electronic components located inside the housing 102. Electrical wires 426 also connect to the impeller drive motor 428.

Other components, such as a motor mounting plate 430, may be provided within the cooker 100.

FIGS. 5A-5C show the cooker 100 in cross section. Here, it is seen that the bulkhead 410 closes the lower housing end 406 to form a first cavity 500 between the bulkhead 410 and the housing 102. The display 104 also may form part of the first cavity 500, such as by forming a closure at the upper housing end 404. The PCB 408 is located within the first cavity 500. O-ring seals 502, or other seals may be provided between the bulkhead 410 and the housing 102 to make the first cavity 500 fluid-resistant. To assure that the bulkhead 410 and housing 102 are properly connected during assembly the bulkhead 410 may include a circumferential rib 504 or similar stop structure, against which the lower housing end 406 sits when the parts are fully-assembled.

The heat sink 416 is attached to the bulkhead 410 to form a second cavity 506. The second cavity 506 may be formed, at least in part, by a sidewall 510 that forms a recess in the heat sink 416. The recess extends from the upper heat sink end 418 towards the lower heat sink end 420, and may have any suitable shape. For example, the recess may comprise a cylindrical inner wall (i.e., mostly or entirely cylindrical), which may be shaped to engage a similarly-shaped outer surface of the lower bulkhead end 414. A seal, such as an O-ring seal 512 may be provided to make the second cavity 506 fluid-resistant at the junction of the bulkhead 410 and the heat sink 416. In a preferred embodiment, the second cavity 506 is fluid impervious in satisfaction of the IPx7 level of water resistance, which requires that ingress of water in a harmful quantity (e.g., sufficient to cause an electrical hazard to a user or to cause the device to short circuit) is not possible when the enclosure is immersed in water under for 30 minutes with the lowest point of the enclosure at 1 meter below the water surface or the highest point of the enclosure at 150 mm below the water surface (whichever is deeper). It is also preferable that the first cavity 500 satisfies the IPx7 level of water resistance.

In this example, the motor 428 is located in the second cavity 506, and captured between an internal bulkhead wall 508 and the motor mounting plate 430. In other examples, the motor 428 may be located in the first cavity 500, or may be secured by alternative structures. The second cavity 506 may be sealed against the first cavity 500, or it may have one or more openings passing to the first cavity 500. For example, one or more openings may extend through the internal bulkhead wall 508 to permit the passage of electrical wires 426 or the like between the first cavity 500 and the second cavity 506. Such openings may be sealed around the wires 426 if an air- or fluid-resistant seal is desired.

The drive shaft 208 extends from the motor 428 and passes through the lower heat sink end 420. The heat sink 416 may include a bearing 514 to surround the drive shaft 208 and support it in the lateral direction (i.e., the direction perpendicular to the longitudinal axis 112). The heat sink 416 also may include a shaft seal 516 to surround the drive shaft 208 and provide a fluid-resistant seal between the drive shaft 208 and the heat sink 416.

As noted above, the skirt 106 may be attached at the upper skirt end 422 to the bulkhead 410. For example, the skirt 106 may surround the outer surface of the bulkhead 410 and abut a lower side of the circumferential rib 504 to provide a positive stop during assembly. The lower housing end 406, circumferential rib 504 and upper skirt end 422 may form a continuous wall profile along a predetermined distance along the longitudinal axis 112, to allow the clamp 200 to slide vertically up and down across the connection between the parts. The skirt 106 may be connected to the bulkhead 410 using any suitable reversible or irreversible fastening mechanism, such as screws, rivets, adhesives, and so on. In the shown example the skirt 106 is attached to the bulkhead 410 by so-called bayonet connectors. The bayonet connectors comprise one or more pins 432 that extend radially-inward from the skirt 106 to engage corresponding slots 434 formed in the outer surface of the bulkhead 410. The slots 434 extend from the lower bulkhead end 414 towards the upper bulkhead end 412, preferably along the longitudinal axis 112, and then turn to extend circumferentially around the central axis of the bulkhead 410. The skirt 106 is secured to the bulkhead 410 by sliding the pins 432 axially and then circumferentially along the slots 434. The ends of the slots 434 may include recesses into which the pins 432 snap fit to resiliently hold the pins 432 in place.

The heat sink 416 may be recessed to allow also the pins 432 to be moved into the slots 434. For example, the entire outer surface of the heat sink 416 may be narrow enough to pass between the pins 432. As another example, the heat sink 416 may comprise slots 436 that extend from the lower heat sink end 420 to the upper heat sink end 418 and are shaped to guide the pins 432 to the slots 434 on the bulkhead 410. The use of slots 436 on the heat sink 416 is expected to allow the heat sink 416 to be as large as possible in the radial direction, which can help increase its heat dissipation capacity. The outer wall of the heat sink 416 also may help support the skirt 106 if it is in direct or indirect contact with the skirt 106.

Alternatively, the skirt 106 may be connected to heat sink 416 by one or more fastening mechanisms, such as those discussed above.

A portion of the skirt 106 at the upper skirt end 422 surrounds some or all of the heat sink 416 in the lateral direction. An air gap 520 may be provided between the skirt 106 and the heat sink 416 to prevent or reduce direct physical contact therebetween. The skirt 106 also may be spaced from the heat sink 416 by an insulating sleeve 522 or other structure (e.g. high-temperature plastic or the like). The use of air gaps 520 and insulating sleeves 522 (or combinations thereof) is expected to provide greater thermal isolation between the skirt 106 and the heat sink 416, to help maintain the skirt 106 at a temperature more suitable for contact by an operator. However, in alternative embodiment, the skirt 106 and heat sink 416 may contact one another directly or through a heat transfer medium to provide improve heat dissipation from the heat sink 416. The choice of using an air gap 520 or insulating sleeve 522, or alternatively using direct conductive contact, will be a matter of design choice based on considerations such as reducing the temperature to which a user might be exposed, and improving heat dissipation.

The lower skirt end 424 is located below the lower heat sink end 420 to form a third cavity 518 between the skirt 106 and the heat sink 416. The heating element 202 is located in the third cavity 518. The heating element 202 may be rigidly mounted to the heat sink 416 to hold the heating element 202 at the desired location within the third cavity 518. For example, the upper end of the heating element 202 may be threaded, press-fit or adhesively bonded into a corresponding bore 524 through the lower heat sink end 420.

Also located in the third cavity 518 are the impeller 204 and a portion of the drive shaft 208 that operatively connects the motor 428 to the impeller 204. The impeller 204 may be located at any suitable position to interact with the cooking liquid. In the shown embodiment, the impeller 204 is located between the lower skirt end 424 and the heating element 202, and adjacent an outlet opening 110. When the motor 428 is operated, it rotates the impeller 204 via the drive shaft 208, and the impeller 204 thereby draws liquid into the inlet openings 108, down past the heating element coils 206, and out through the outlet opening 110. Other embodiments may use other configurations for the various parts, such as an arrangement in which the liquid is passed upwards past the coils 206 or the like. Other alternatives and variations will be apparent to persons of ordinary skill in the art in view of the present disclosure.

The water level sensor(s) 210 and temperature sensor(s) 212 are also located in the third cavity 518. As with the heating element 202, the water level sensor(s) 210 and temperature sensor(s) 212 may be rigidly secured to the heat sink 416 to ensure their proper positioning within the third cavity 518. To this end, the heat sink 416 may include additional bores to receive the upper ends of the sensors 210, 212, which may be secured by any suitable configuration of parts or type of connection. In some cases, it may be necessary to insulate one or more of the sensors 210, 212 from electrically-conductive contact with other components via the metal heat sink 516. In such cases, each potentially-affected sensor 210, 212 may be connected to the heat sink 516 through a rigid insulators 526, such as a nylon ring or the like. It also may be desirable to provide insulation to prevent inadvertent electrical contact between the sensors or other components by condensed steam or splashed water that might accumulate at the lower heat sink end 420. To this end, a seal of insulating material 528 (e.g., rubber or the like) may the portion of the lower heat sink end 420 surrounding the potentially-affected sensors 210, 212. In the shown example, the insulating material 528 comprises a first portion 530 that lies against the heat sink 416, and one or more additional portions 532 that extend downward along respective sensors 210, 212. The downward-extending portions 532 provide an additional measure of assurance that water will not create a potentially-harmful electrical path between the electrical components.

Figure 6:
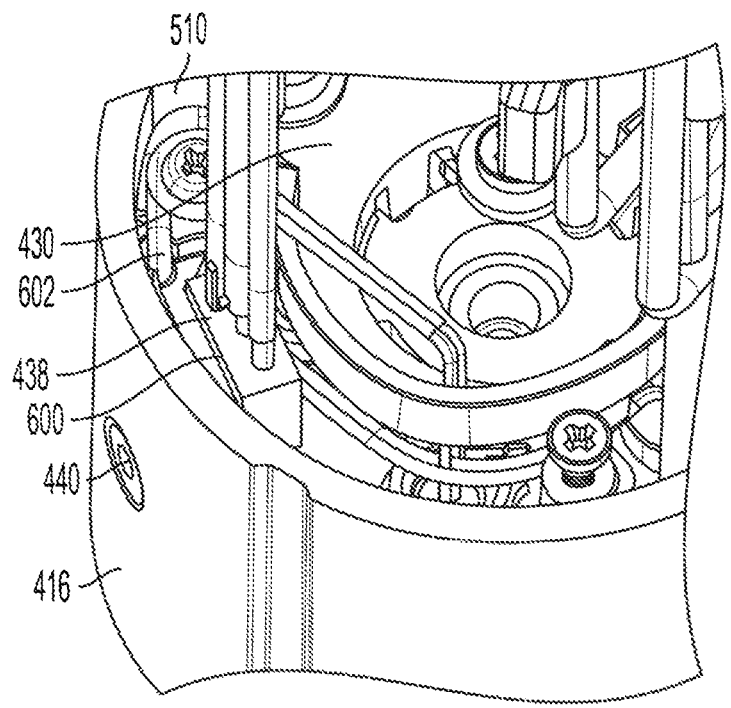
FIG. 6 is a fragmented view showing portions of the first exemplary sous vide cooker
Figure 7:
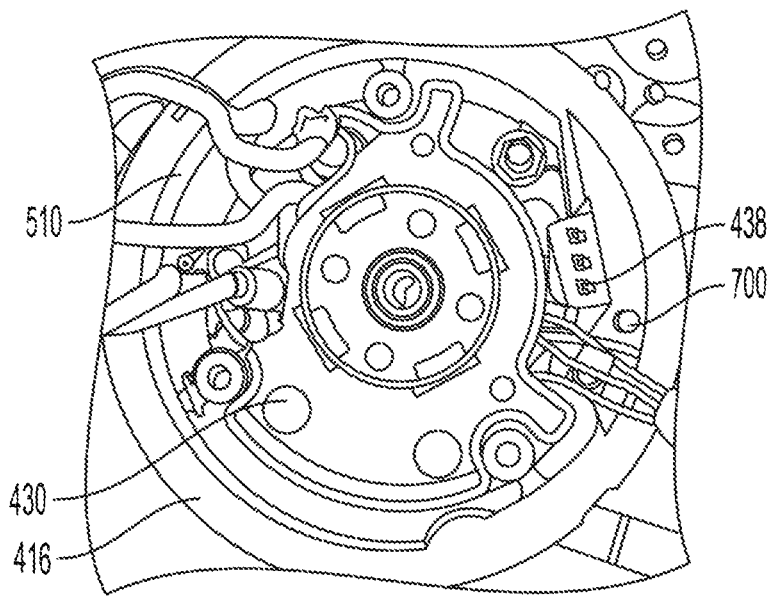
FIG. 7 is a fragmented view showing portions of the first exemplary sous vide cooker
Figure 8:
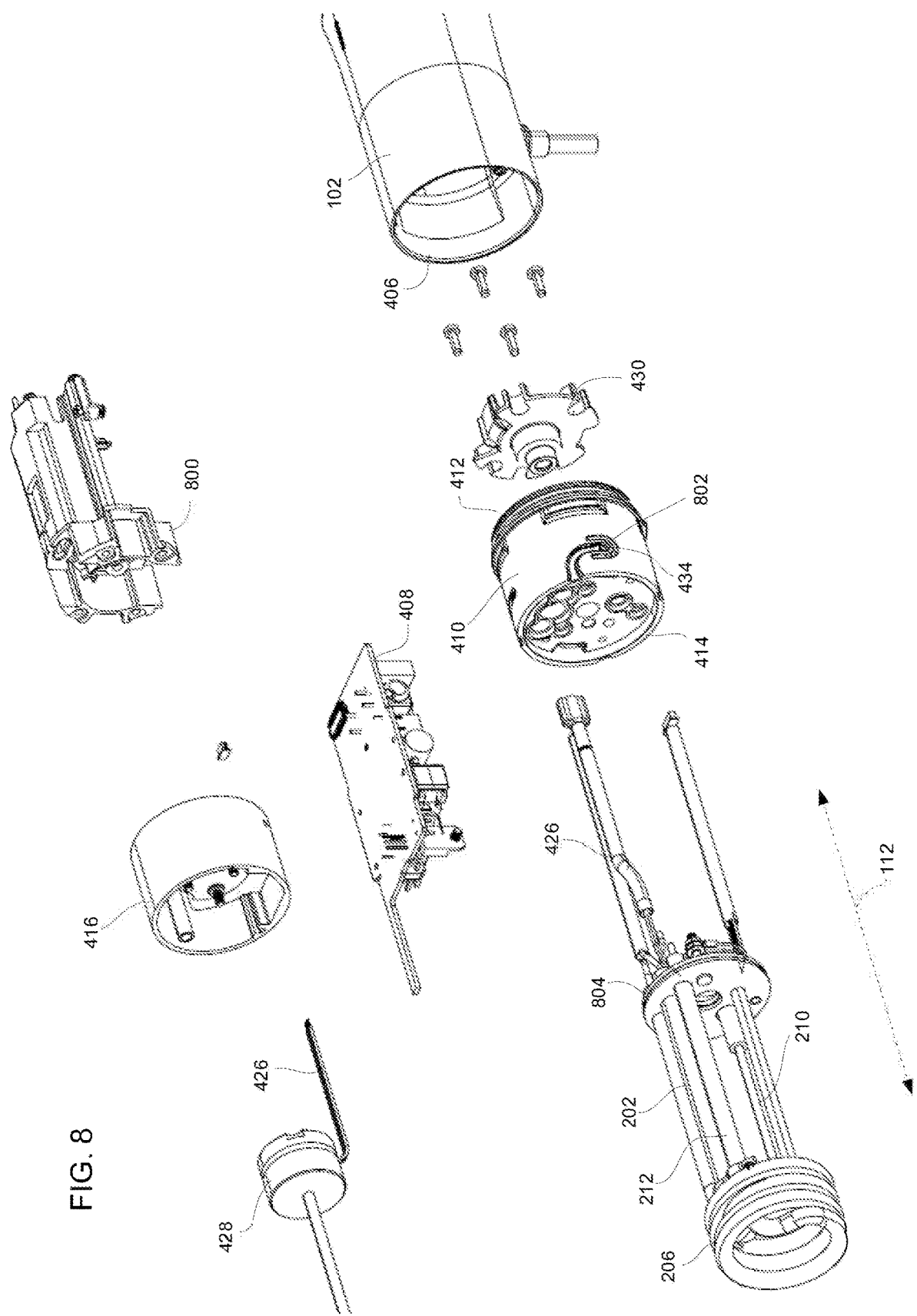
FIG. 8 is a partially fragmented exploded view of a second exemplary sous vide cooker.
Figure 9:
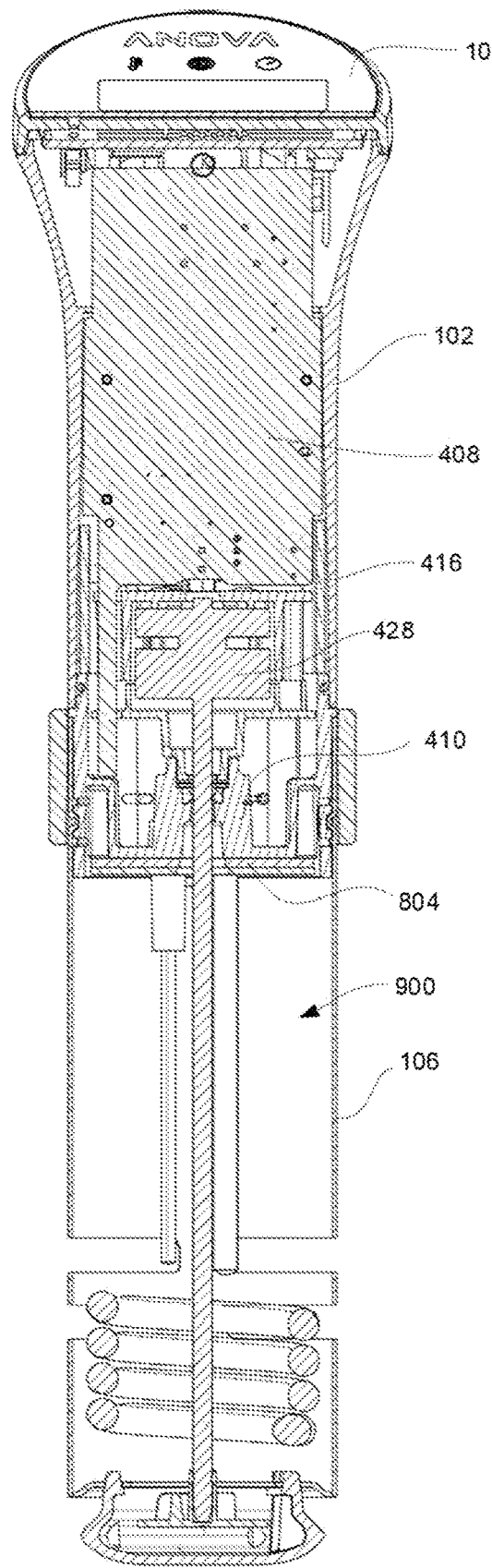
FIG. 9 is a cutaway front elevation view of the second exemplary sous vide cooker.
Figure 10:
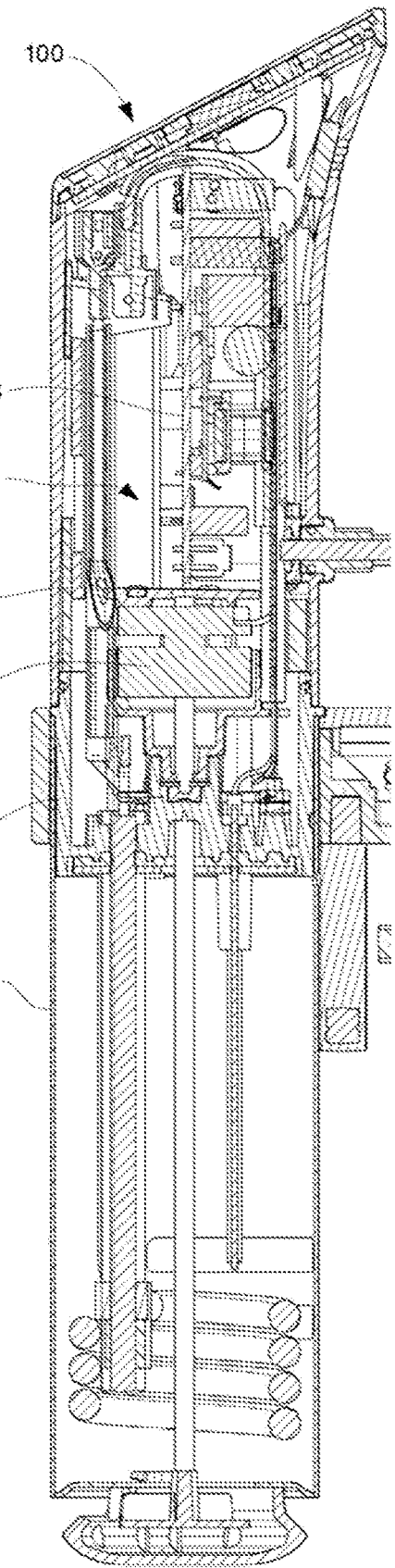
FIG. 10 is a cutaway side elevation view of the second exemplary sous vide cooker.
Figure 11:
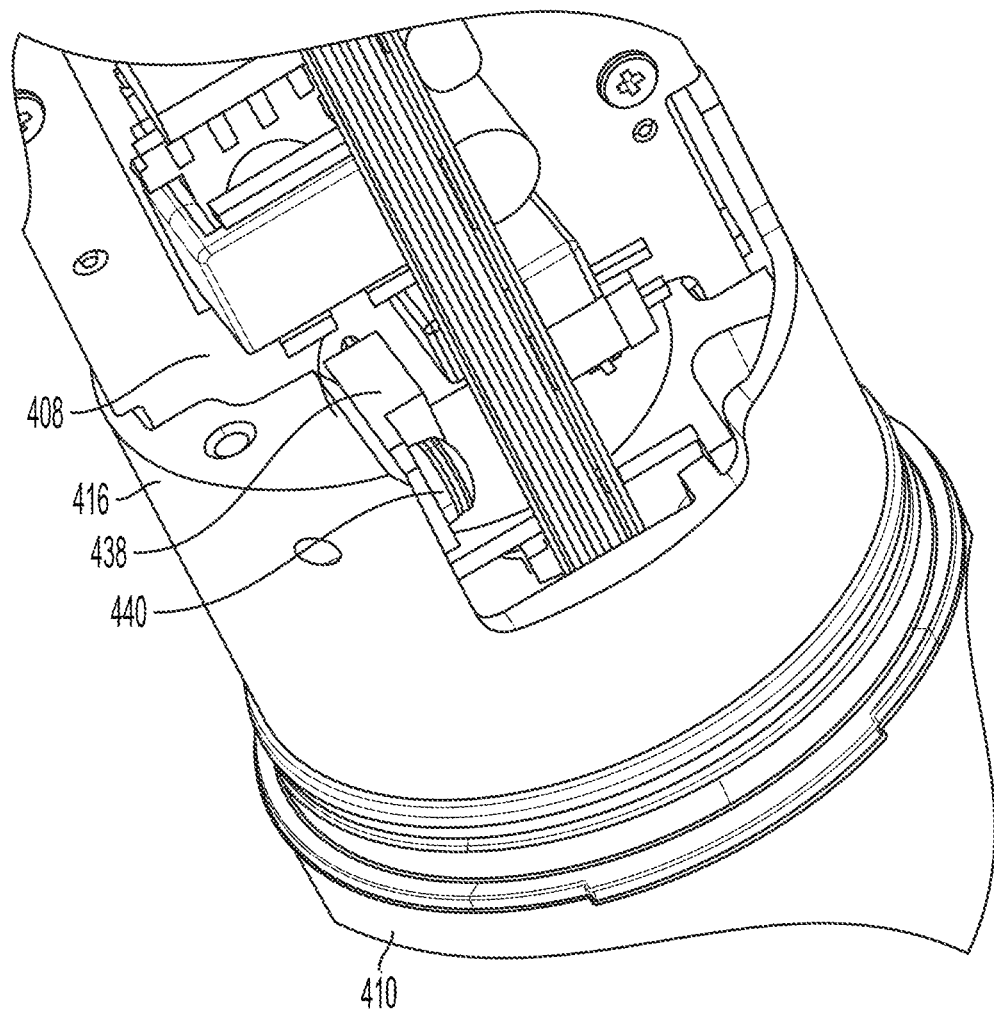
FIG. 11 is a fragmented view showing portions of the second exemplary sous vide cooker.

Referring now to FIGS. 5B, 6 and 7, the purpose of the heat sink 416 and features of an exemplary heat sink structure are described in more detail. The heat sink 416 is provided to dissipate heat generated by electrical components, such as a TRIAC 438. TRIACs are well-known devices, and are sometimes referred to as a bidirectional triode thyristor, bilateral triode thyristor, or the like. In general terms, a TRIAC is used as a switching device to control the output of power provided by a cyclical power source, such as a rectified or unrectified AC power supply. The details of TRIACs are known in the art and need not be described in detail herein.

While TRIACs are in common use in various devices, they are known to generate a significant a significant amount of heat during use. For example, a TRIAC operating a 1200 watt heating element can generate its own heat load of about 9 watts (i.e., 9 joules of heat per second). Such heat loading is typically addressed by providing air ventilation to cool the TRIAC. However, in the context of a sealed appliance such as a modern sous vide cooker (early sous vide cookers typically were not water-tight), ventilated air cooling within the housing containing the TRIAC is not possible. It is also not feasible to simply move the TRIAC to a located where it is cooled by ambient air, because doing so would compromise the fluid-tight nature of the appliance. Still another problem can arise if the TRIAC is cooled by conductive heating to ambient air, such as by attaching the TRIAC to a heat sink located on the outer surface of the device, which is that the heat sink can attain temperatures that might be unacceptable to expose to the user of the device.

To address these problems, the TRIAC 438 and heat sink 416 may be contained within the cooker 100, where direct contact with the user is difficult or impossible. In addition, the TRIAC 438 preferably is sealed within the cooker against contact with liquid in the cooking bath, or water that might passed over the cooker 100 during cleaning the cooker 100 or filling the cooking bath.

In the shown example, the heat sink 416 is contained within the skirt 106, and has a sidewall 510 that forms a recess, such as described above. The sidewall 510 extends from the upper heat sink end 418 towards the lower heat sink end 420, and terminates at a bottom wall 534 at the lower end of the sidewall 510. The TRIAC 438 is physically attached, such as by a screw 440, in conductive thermal communication with the heat sink 416 within the second cavity 506. In the shown example, the TRIAC 438 is attached to the sidewall 510, but alternatively it may be attached to the bottom wall 534 or other surfaces of the heat sink 416. The TRIAC 438 may be attached directly against the heat sink 416 surface, or by a heat-conducting material such as a layer of thermal grease 600 or the like to provide a more uniform or distributed conduction heat path. Such conductive thermal communication provides a direct flow of heat from the TRIAC 428 to the heat sink 416, but convective and radiation heat transfer from the TRIAC 438 to the heat sink 416 may also occur to some degree.

The TRIAC 438 is operatively connected to the PCB 408 by wires 426. In use, the PCB 408 controls the TRIAC 438, motor 428 and heater 202 to heat and circulate liquid in the cooking bath, using input from the sensors 210, 212 as feedback to evaluate the temperature and water level of the liquid. For example, the motor rotation speed and/or heater power output may be adjusted based on water level and/or temperature determinations, and the PCB 408 can display output on the display 104 and/or send signals wirelessly to a remote control (e.g., a smartphone operating an app) to provide instructions to add water, unplug or turn off the device, and so on. Such operations are known in the art and need not be described in detail herein.

The temperature of the heat sink 416 and/or TRIAC 438 may be monitored by one or more temperature sensors. For example, an axial bore 700 may be provided in the heat sink 416 adjacent the TRIAC mounting location, and a temperature sensor 602 such as a thermocouple or the like may be secured in the bore by adhesives or a fastener. Such temperature monitoring at the location of the TRIAC 438 is expected to allow rapid evaluation of potential overheating situations. When an overheat is detected, a signal may be transmitted to terminate power, and, if the overheat is great enough, a message may be conveyed to the operator to refrain from handling the cooker 100 until the elevated temperature situation has subsided.

As noted above, the heat sink 416 may include ribs or other structures to increase its surface are or to encourage convection cooling flows. However, it has been found that a heat sink 416 having a simply cylindrical shape can be sufficient to dissipate heat from the TRIAC 438 without unduly heating the skirt 106 or housing 102 to a temperature that might be unsuitable for contact by the user. In the shown example, the heat dissipating capacity of the heat sink 416 may be increased by extending the outer cylindrical wall downwards below the bottom wall 532 of the second cavity 506, such as shown in FIGS. 5A-5C. In this way, heat may be conducted over a larger area to be further dissipated to the skirt 106 and surrounding air in the second and third cavities 506, 518.

The cylindrical shape of the sidewall 510 also may be helpful to locate the TRIAC 438 relatively far, in the lateral direction, from the motor 428 and other operating parts, and to maximize the volume of air within the heat sink recess to insulate the other components from heat generated by the TRIAC 428.

The foregoing embodiment of a cooker 100 has a generally cylindrical outer shape, with the skirt 106 being cylindrical along most of its length, and the housing 102 being cylindrical along about half of its length. This shape allows the clamp 200 to slide up and down to position the skirt 106 at different locations within the liquid cooking bath, and allows the clamp 200 to rotate to orient the inlets 108 and outlets 110 into different orientations to direct the water flow in the container. Other embodiments may have other outer shapes. For example, the skirt 106 and/or housing 102 may have an oval, square or polyhedral profile. In such cases, the heat sink 416 optionally may be reconfigured to match the shape of the third cavity 518.

It will be appreciated that the TRIAC 438 may be replaced with other electrical devices that generate a high thermal load while switching power, such as a metal-oxide-semiconductor field-effect transistor (MOSFET), insulated-gate bipolar transistor (IGBT), or the like, or with other electrical devices that generate a high thermal load while performing other functions (e.g., resistors or the like).

FIGS. 8-11 show an alternative embodiment of a cooker 100. In this case, the cooker 100 has many of the same features as the previous embodiment, including a housing 102, skirt 106 and so on. For simplicity, the Figures are annotated to indicate similar features, and other similar features will be readily apparent from the illustrations. In this case, the bulkhead 410 is once again mounted to the lower housing end 406 to form a first cavity 500, however, the motor 428 is positioned within the first cavity 500 with a lower end of the motor 428 being cradled in a motor mounting plate 430 and the upper end of the motor 428 being held by a motor cover 800. The PCB 408 is located in the first cavity 500 adjacent to (and optionally attached to) the motor cover 800.

The skirt 106 is removably attached to the bulkhead 410 by a bayonet fitting. In this case, the bayonet fitting slots 434 terminate at a cantilevered end to provide a snap engagement with the pins of the skirt 106. The cantilevered end is formed by making a U-shaped slot 802 in the portion of the bulkhead 410 surround in the end of the slot 434. The skirt 106 forms a second cavity 900 below the lower bulkhead end 414. The heating element 202 and sensors 210, 212 are attached to a mounting plate 804 to extend from the lower bulkhead end 414 into the second cavity 900.

In this example, the heat sink 416 is located in the first cavity 500, which preferably is sealed sufficiently to satisfy the IPx7 level of water resistance. Specifically, the heat sink 416 comprises a ring-shaped metal structure located inside the housing 102 at a location where it surrounds various components, such as the upper end of the motor 428 and the lower end of the PCB 408. It is preferred for the heat sink 416 to extend entirely around as a complete ring, but this is not required. For example, the heat sink 416 may be a partial ring. The ring-shaped heat sink 416 preferably is positioned laterally outside the perimeter of the motor 428 and/or PCB 408, and may be directly adjacent to an inner wall of the housing 102 so as to maximize the size of the heat sink 416 within the housing 102.

As with the previous embodiment, the TRIAC 438 is mounted in direct conductive contact with the heat sink 416 (directly or via thermal grease or other heat distributing material or layer). In this example, the TRIAC is also connected directly and rigidly to the PCB 408, such as by being soldered in place, rather than being connected remotely to the PCB 408 by wires 426. This configuration provides a more compact arrangement of parts, while still providing sufficient heat dissipating capacity of the heat sink 416 to allow the use of a TRIAC 438 inside a sealed chamber formed by the housing 102 and bulkhead 410. This configuration is also expected to simplify assembly in some instances.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A sous vide cooker comprising:
   an impeller;
   a motor operatively connected to the impeller via a drive shaft;
   a heating element;
   an electrical device that generates heat during operation;
   a heat sink in conductive thermal communication with the electrical device; and
   a housing assembly that contains the impeller, motor, heating element, electrical device, and heat sink, the housing assembly defining one or more openings,
   wherein the heating element is mounted to the heat sink.

2. The sous vide cooking according to claim 1, wherein the electrical device comprises:
   a TRIAC,
   a metal-oxide-semiconductor field-effect transistor,
   an insulated-gate bipolar transistor, or
   a resistor.

3. The sous vide cooking according to claim 1, wherein the electrical device comprises a TRIAC.

4. The sous vide cooker of claim 1, wherein the heat sink comprises a monolithic piece of aluminum.

5. The sous vide cooker of claim 1, wherein the heat sink is ring shaped.

6. The sous vide cooker of claim 1, wherein the heat sink surrounds at least a portion of the motor.

7. The sous vide cooker of claim 1, wherein the heat sink comprises one or more ribs or vanes.

8. A sous vide cooker comprising:
   an impeller;
   a motor operatively connected to the impeller via a drive shaft;
   a heating element;
   an electrical device that generates heat during operation;
   a heat sink in conductive thermal communication with the electrical device, wherein the heat sink comprises a shaft passage through which the drive shaft passes, and a bearing in the shaft passage to support the drive shaft; and
   a housing assembly that contains the impeller, motor, heating element, electrical device, and heat sink, the housing assembly defining one or more openings.

9. The sous vide cooker of claim 1, wherein the electrical device is attached to the heat sink by a layer of thermal grease.

10. A sous vide cooker comprising:
    an impeller;
    a motor operatively connected to the impeller via a drive shaft;
    a heating element, wherein the heating element comprises a coil surrounding the drive shaft;
    an electrical device that generates heat during operation;
    a heat sink in conductive thermal communication with the electrical device; and
    a housing assembly that contains the impeller, motor, heating element, electrical device, and heat sink, the housing assembly defining one or more openings.

11. The sous vide cooker of claim 1, further comprising at least one temperature sensor or water level sensor mounted to the heat sink by an electrical insulator.

12. The sous vide cooker of claim 1, wherein:
    the housing assembly defines a sealed cavity that contains the electrical device, and a separate cavity that contains the impeller and can receive a cooking liquid via the one or more openings.

13. The sous vide cooking according to claim 1, wherein the housing assembly includes:
    a housing defining an upper end of the housing assembly, and
    a skirt attached to the housing, the skirt defining a lower end of the housing assembly.

14. The sous vide cooking according to claim 13, wherein the housing assembly includes a bulkhead that attaches the skirt to the housing.

15. The sous vide cooking according to claim 14, wherein:
    the bulkhead and housing form a first cavity;
    the heat sink and bulkhead form a second cavity;
    the skirt and the heat sink form a third cavity;
    the electronic device is in the second cavity; and
    the impeller and heating element are located in the third cavity.

16. The sous vide cooking according to claim 14, wherein:
    the bulkhead and housing form a first cavity;
    the skirt and bulkhead form a second cavity;
    the electronic device is in the first cavity; and
    the impeller and heating element are located in the second cavity.

17. The sous vide cooking according to claim 13, wherein the heat sink is at least partially arranged within a cavity defined by the skirt, and is spaced from the skirt by a gap so as so as to not directly contact the skirt.

18. The sous vide cooker of claim 13, further comprising an insulation sleeve located between and physically separating the skirt and the heat sink.

19. The sous vide cooker of claim 1, further comprising a printed circuit board within the housing assembly, wherein the electrical device is operatively connected to the printed circuit board.

* * * * *